Patented May 16, 1933

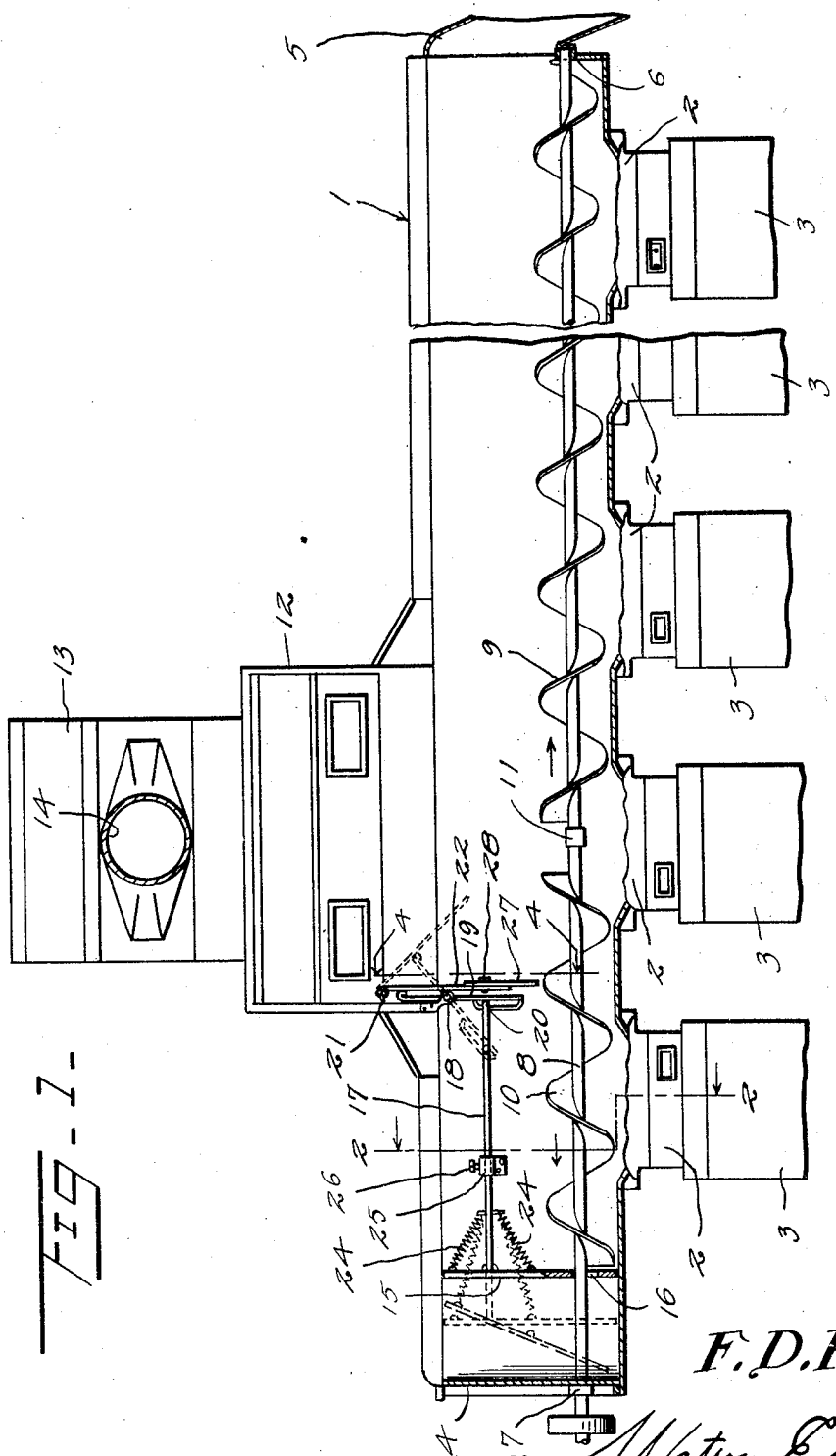

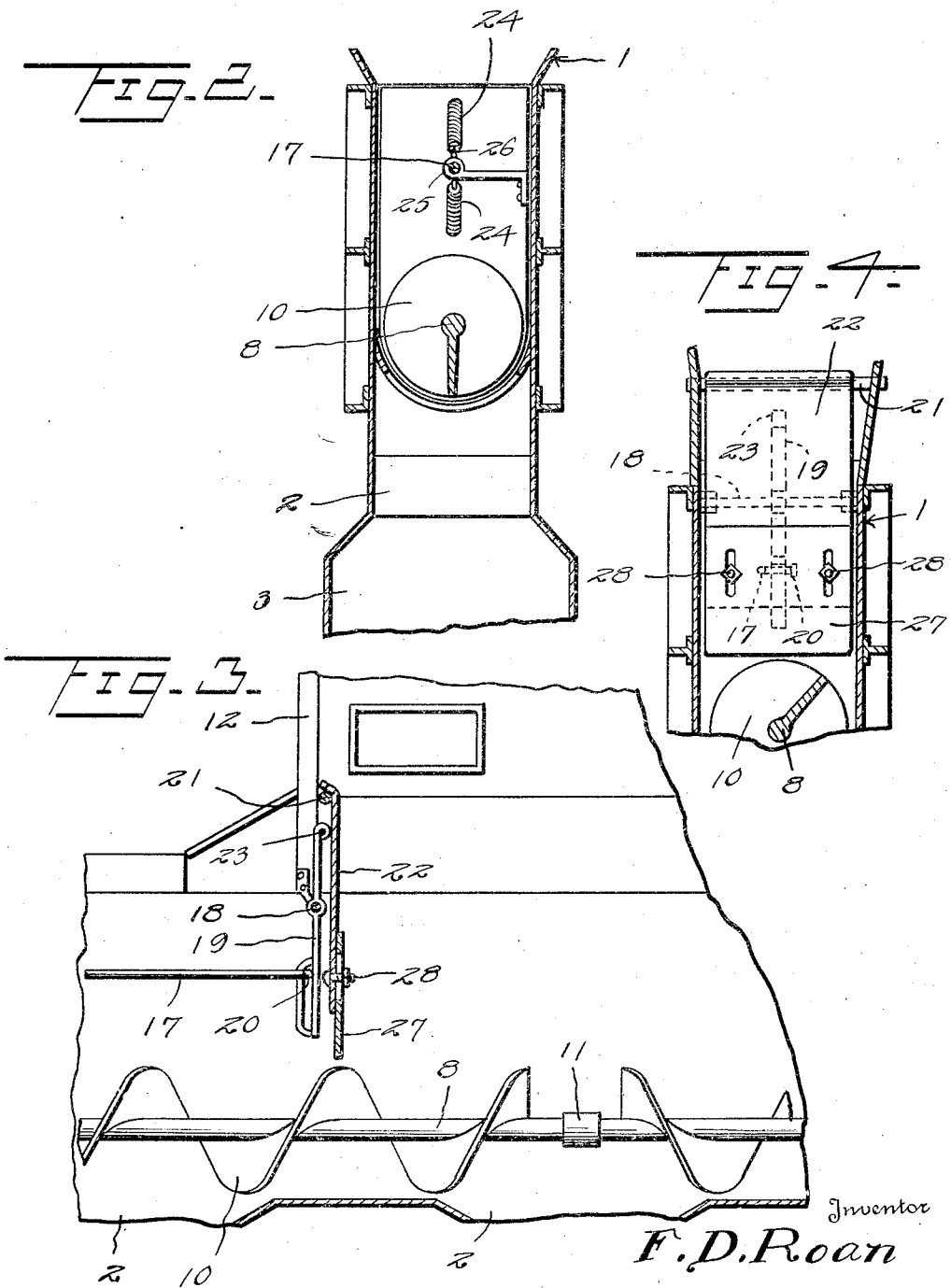

1,909,722

UNITED STATES PATENT OFFICE

FLOYD D. ROAN, OF FLOYDADA, TEXAS

COTTON DISTRIBUTING MECHANISM FOR GINNING MACHINES

Application filed June 9, 1932. Serial No. 616,303.

This invention relates to mechanisms for conveying cotton from a cotton cleaner to a number of ginning machines and relates particularly to a distributor in the form of a screw conveyor.

The primary object of the present invention is to provide a mechanism whereby cotton will be continuously supplied in two directions from a separator and cleaner which is located centrally of two groups of ginning machines.

Another object of the invention is to provide in a cotton distributing mechanism, means operating automatically to shut off the continued feeding of the cotton in one direction for a period when the ginning machines on one side become filled, the distribution of cotton to the machines continuing automatically as the machines are capable of receiving it.

A still further object of the invention is to provide a cotton distributing mechanism having a double screw for distributing cotton in two directions from a cleaner and having a valve element for shunting the cotton from one screw which is operated by a shiftable member which is in turn operated by the pressure of cotton backed up thereagainst when the adjacent gins become filled.

The invention will be best understood from a consideration of the following detailed description taken in connection with the accompanyivng drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:—

Figure 1 is a vertical longitudinal section through the distributor showing the present invention;

Figure 2 is a vertical sectional view taken upon the line 2—2 of Figure 1;

Figure 3 is an enlarged detail view of the cotton deflecting valve;

Figure 4 is a vertical sectional view taken substantially upon the line 4—4 of Figure 1.

Referring now more particularly to the drawings wherein like numerals of reference indicate corresponding parts throughout the several views, the numeral 1 indicates generally the housing or box through which cotton is conveyed to the several ginning machines over which it lies.

The lower part of this housing which is of elongated design, opens downwardly at a number of points throughout its length into feeder hoppers 2, each of which in turn discharges into a gin stand feeder 3. At one end the housing 1 is closed by the end wall 4, while the opposite end opens into a downwardly directed hood 5. Mounted in a suitable manner in the end of the housing adjacent the hood 5 is a bearing 6, and a similar bearing 7 is located in the end wall 4 at the other end of the housing. Extending longitudinally through the housing 1 is a screw conveyor shaft 8 on which are screws 9 and 10, one of which is a right hand screw, while the other is a left hand screw.

The adjacent ends of the screws 9 and 10 are slightly spaced apart and between them the shaft 8 extends through a central bearing 11 which is located directly beneath the central part of the cotton cleaner 12 which opens through he top of the conveyor housing 1. The cleaner 12 is fed from the hopper 13 into which the cotton is discharged through the inlet opening 14.

In the closed end of the housing 1 there is disposed the vertically arranged plate 15 through the lower part of which is a vertical passage 16 through which the shaft 8 freely passes and this plate has free movement longitudinally of the housing between the end wall 4 and the adjacent end of the screw 10. The upper end of the plate 15 has connected thereto one end of a rod 17 which extends longitudinally in the housing 1 toward the inlet from the cleaner 12.

Mounted upon a suitable transversely extending supporting pivot 18 is an oscillatable arm 19, the connection of the same with the pivot 18 being at a point intermediate its ends and the lower end of this arm 19 extends downwardly into the housing 1 and is pivotally connected as at 20 with the other end of the rod 17.

Adjacent the cleaner 12 there is pivotally mounted at 21 upon the walls of the housing adjacent which the arm 19 is mounted, a depending valve plate 22 between which and the adjacent cleaner wall the upper end of the arm 19 positions. The said upper end of the arm 19 is suitably formed as at 23 for sliding contact with the back of the valve plate 22 so that as will be readily apparent when the arm 19 is oscillated in one direction its upper end will press against the plate 22 and cause it to swing outwardly on its pivot 21. The inner end of the screw 10 is so disposed with regard to the valve plate 22 that when the plate is hanging downwardly in its normal position cotton entering the housing 1 from the cleaner will be picked up by this screw as well as by the screw 9 but when the plate 22 is oscillated so that its lower end swings toward the vertical center of the cleaner it will extend a sufficient distance to deflect the cotton falling from the cleaner away from the screw 10 so that it will only be picked up by the screw 9.

The plate 15 is connected near its top with a pair of spring members 24 and these are connected to a suitable fixed connection from a part of the conveyor housing, so that when the plate 15 moves in the housing toward the end 4 the springs will be placed under tension and will tend to draw the plate back to its normal position.

In order that the valve plate 22 may be held in cotton deflecting position so that one of the gin machines may be cut-out of service, there is provided a means for holding the rod 17 after it has been shifted longitudinally in the housing toward the closed end 4. While any suitable means for effecting this result may be employed there is illustrated a guide bracket 25 carried by a wall of the conveyor housing, through which bracket the rod 17 passes and the bracket carries a set screw 26 which will hold the rod against movement in the bracket.

In the operation of the present distributor the valve plate 22 normally hangs vertically as shown in Figure 1, and, therefore, the cotton dropping into the housing from the cleaner 12 will be picked up by the adjacent ends of the screws 9 and 10 and conveyed in opposite directions in the housing to pass downwardly into the feeder hoppers 2. Should the gin machines which are located between the inlet from the cleaner 12 and the closed end of the conveyor housing become filled so that they cannot take any more cotton then the screw 10 will bank the cotton up against the shiftable plate 15 and this will be moved toward the closed end 4 of the housing. This shifting of the plate 15 will result in the shifting of the rod 17 and thus cause the valve plate 22 to be swung toward the center of the cleaner by the arm 19, in which position it will be held until the filled gin machines are capable of taking more cotton, and thus deflect the cotton entering the housing onto the screw 9. Should the gin machines lying beneath the screw 9 become filled the cotton will be carried on over them to the end of the housing which is covered by the hood 5, and discharged therefrom into a suitable receiver.

As will be readily apparent, after the gin machines lying beneath the screw 10 are capable of taking more cotton they will take in the cotton packed against the plate 15 and thus allow the plate to return to its normal position and permit the valve plate 22 to swing down and thus allow more cotton to be fed to the screw 10.

Should it become desirable or necessary for any reason to cut-out of service the gin machines lying beneath the screw 10 this may be effected by shifting the plate 15 toward the end 4 of the housing and then tightening the screw 26 against the rod 17 to hold it in this position against the tension of the springs 24, thus retaining the swinging valve plate 22 in the outwardly swung position where it will operate to deflect all the cotton leaving the cleaner onto the screw 9.

The valve plate 22 has secured to the lower part thereof an extension plate 27 which is adjustably secured thereto by a screw and thumb nut 28. This screw extends through a suitable slot in the extension plate so that it may be shifted as desired for lengthening the valve plate 22.

From the foregoing it will be readily seen that with the present mechanism two groups of gin machines may be continuously fed from the cleaner, whereas in distributors of the type at present in use, while a double screw arrangement is employed for distributing cotton to two groups of ginning machines, only one group of machines is fed at a time as a swinging valve is employed similar to the valve plate 22 of the present invention, which first turns the cotton off toward one screw while the ginning machines beneath the other screw are working upon the cotton, which has previously been fed thereto and is then swung over to change the direction of flow of the cotton so that the previously served group of machines may be working upon the cotton which they have received while the other group are receiving their share. The present mechanism, being automatic in its operation, takes care of both groups of ginning machines and serves cotton to both at the same time.

Having thus described the invention, what is claimed is:—

1. In a cotton distributing mechanism, a cleaner, a housing arranged to receive cotton from said cleaner and having a plurality of outlets, said outlets being arranged in two groups with the cleaner therebetween, means within the housing for simuletaneously distributing cotton to the two groups of outlets, an overflow outlet in one wall of the housing remote from the cleaner, and means in the housing adjacent the wall remote from the outlet designed to be operated upon by cotton forced thereagainst by the distributing means when adjacent outlets have become filled, to effect the discharge of cotton from the cleaner away from the filled outlets.

2. In a distributing mechanism of the character described, an elongated housing, means for discharging material into the housing at a point intermediate its ends, the lower part of the housing having a longitudinally extending series of outlets, a pair of conveyor elements arranged in alignment in the housing to carry material in opposite directions therein, means providing an overflow at one end of the housing for material, a deflector element which when shifted to one position causes the discharge of material into the housing onto the conveyor carrying material to said overflow, and means at the other end of the housing from the overflow and connected with said deflector for shifting the deflector when material is forced thereagainst by the adjacent conveyor.

3. In a mechanism for distributing cotton from a central point through an elongated housing to two series of gin features, a double screw mechanism within the housing each overlying a series of gin feeders and designed to simultaneously carry cotton to both series from a discharging cleaner, the cotton cleaner being disposed above the adjacent ends of the double screw, overflow means at the outer end of one of said screws, a cotton deflecting valve comprising an oscillatable plate arranged when shifted to one position to direct cotton from the cleaner onto the screw leading to the overflow, an element mounted at the outer end of the other screw for movement longitudinally thereof, and connecting means between said last element and said deflector valve whereby movement of the element in one direction will effect the shifting of the valve.

4. In a distributing mechanism of the character described, an elongated casing having a longitudinally extending series of outlets in the bottom thereof, means for discharging material into the casing at the top substantially midway between the ends, a shaft extending through the casing and carrying aligned right and left hand screws, the adjacent ends of the screws being disposed beneath the central part of said material discharging means, an element shiftably mounted in the casing at one end of one of the screws to be operated on by material forced thereagainst by the adjacent screw, resilient means normally retaining said element in one position, and means actuated by the element when shifted against the tension of the resilient means to deflect material entering the casing onto the screw remote from the element.

5. In a distributing mechanism of the character described, an elongated casing having a longitudinally extending series of outlets in the bottom thereof, means for discharging material into the casing at the top substantially midway between the ends, a shaft extending through the casing and carrying aligned right and left hand screws, the adjacent ends of the screws being disposed beneath the central part of said material discharging means, an element shiftably mounted in the casing at one end of one of the screws to be operated on by material forced thereagainst by the adjacent screw, resilient means normally retaining said element in one position, means actuated by the element when shifted against the tension of the resilient means to deflect material entering the casing onto the screw remote from the element, and means for securing the said element in shifted position.

6. In a cotton distributing mechanism, a cleaner, a distributing casing of elongated design having the cleaner discharging thereinto intermediate the ends thereof, the lower part of said casing being in communication throughout its length with gin feeders, a rotatable shaft extending throughout the length of the casing, a right and a left hand screw on said shaft, the adjacent ends of the screws being disposed beneath the cleaner whereby cotton entering the casing will be simultaneously conveyed in two directions, overflow means at one end of said casing, a plate member in the other end of the casing and shiftable longitudinally thereof, said plate member lying between the end of the casing and the adjacent screw, a valve plate pivotally mounted within the lower part of the cleaner at the side thereof adjacent said plate and operative when oscillated to an inclined position to deflect cotton from the cleaner onto the screw remote from the shiftable plate, an oscillatably mounted arm connected at one end with said valve plate, and a connecting rod between the other end of the arm and the shiftable plate whereby upon movement of the latter in one direction the valve plate will be oscillated to an inclined position.

In testimony whereof I hereunto affix my signature.

FLOYD D. ROAN.